B. TURNER.
BALL BEARING CASTER.
APPLICATION FILED JAN. 19, 1909.

967,085.

Patented Aug. 9, 1910.

Witnesses

Inventor
Bertram Turner
By James L. Norris
Atty.

UNITED STATES PATENT OFFICE.

BERTRAM TURNER, OF HANDSWORTH, ENGLAND.

BALL-BEARING CASTER.

967,085.  Specification of Letters Patent.  Patented Aug. 9, 1910.

Application filed January 19, 1909. Serial No. 473,201.

*To all whom it may concern:*

Be it known that I, BERTRAM TURNER, a subject of the King of England, and resident of 4 Whitehall road, Handsworth, in the county of Stafford, England, have invented certain new and useful Improvements in Ball-Bearing Casters, of which the following is a specification.

My invention is comprised in the hereinafter described and claimed construction of ball bearing caster of the kind in which a shank is adapted to fit a socket within the horn, and to rotate therein upon a ball bearing pivot provided between the bottom of the socket and the bottom of the shank.

According to the present invention, the usual cast metal socket is lined internally by a steel insert of tubular form and a disk or washer which fits upon the bottom of the socket. The caster shank is formed to have a fairly good bearing fit in the steel insert and rests upon a centrally arranged ball bearing interposed between the shank and said disk or plate. The socket which may contain lubricant, preferably in a solidified form, is closed by a plate which is secured at the upper end thereof and serves also to hold the caster shank against axial displacement.

An embodiment of the invention is illustrated in the accompanying drawing, wherein:—

Figure 1:
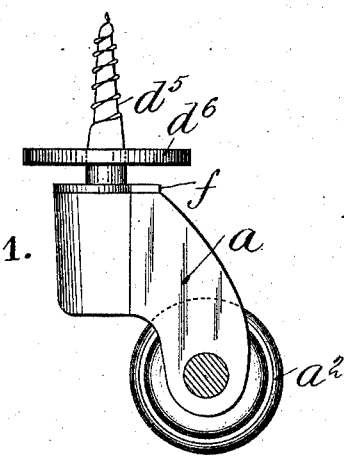
Figure 2:
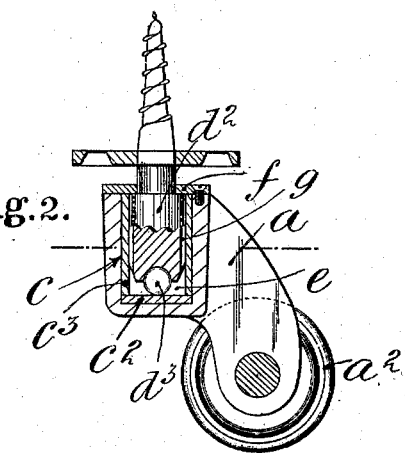
Figure 4:
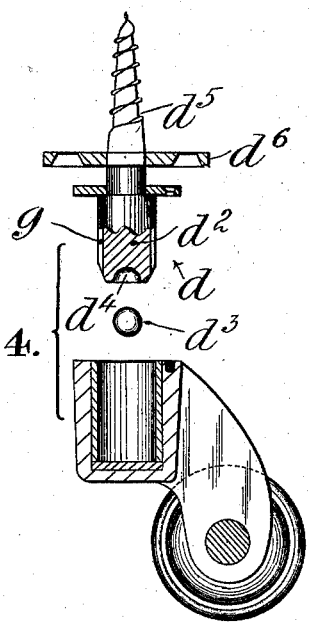
Figure 3:
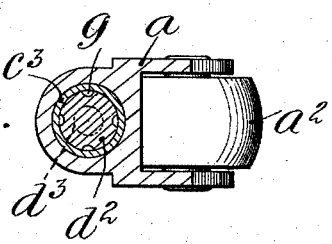
Figure 5:
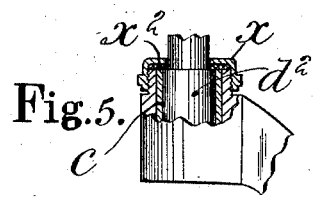

Figure 1 is an elevation. Fig. 2 is a vertical section. Fig. 3 is a horizontal section of Fig. 2 on the dotted lines. Fig. 4 shows the two main parts of the caster separately. Fig. 5 represents a modification.

The horn of the caster is represented at $a$, and carries the usual caster wheel or bowl $a^2$. The circular recess or socket, aforesaid, of the caster horn is represented at $c$, the disk lining the bottom thereof at $c^2$ and the steel tube lining the vertical walls thereof at $c^3$, this tube at one end resting upon the disk. The horn itself can be made of brass or other cast metal, as the parts $c^2$ and $c^3$ form adequate liners to the socket $c$.

The lower part $d^2$ of the caster shank $d$ has a fairly good bearing fit in the lined socket $c$ and rests and turns upon a ball bearing $d^3$, preferably consisting of a single ball working between a seating $d^4$ in the caster shank and the top surface of the disk $c^2$. The upper portion $d^5$ of the caster shank is wood screwed, and provided with an attachment plate $d^6$, or otherwise formed for connection in a proper and convenient manner, to a piece of furniture, or the like.

The socket $c$ wherein works the lower portion of the caster shank is adapted to contain a suitable lubricant $e$. The lubricant is preferably a solidified one of known form, but it may be of liquid form, the idea being for the socket to provide a suitable lubricant container wherein the whole of the pivot parts of caster are placed to be always in lubrication, the upper end of the socket $c$ being closed by a detachable closing plate $f$ after the caster shank is in position in said socket.

In order that the lubricant within the socket $c$ can gain ready access to the cylindrical part, $d^2$, of the caster shank I provide within the said cylindrical part axial, surface, grooves such as $g$, which therefore contain the lubricant. It is not herein intended to make any broad claim to the use of a ball between the bottom of the socket and the lower end of the caster shank, but only to a particular construction and combination of parts which together form an efficient ball bearing and self-lubricating caster. It has been hitherto proposed to provide within the shank of the caster a central lubricating passage and to line a socket with a steel insertion and also to provide an end bearer plate for the conical end of a caster shank, but the arrangement of such parts have been quite distinct and not in connection with the kind of caster to which the invention refers, namely, to one in which the socket is within the horn and the shank rotates upon a ball bearing pivot between the bottom of the socket and the bottom of the shank.

In the modification Fig. 5 the recess or socket $c$ is closed at its upper end by a screw-on cap $x$ wherein is contained a dust proof washer $x^2$, which tends to keep dust from the interior of the socket. The cap may be secured in position by any suitable device if necessary.

Having now described my invention what I claim and desire to secure by Letters Patent is:—

1. In a ball bearing caster, the combination of a cast metal socket part $c$ provided as part of the horns, an internal tube lining the walls of the said socket, a disk lining the bottom of the said socket, the caster shank fitting and working in said socket, and a ball bearing between the bottom of the caster shank and the bottom of the socket, substantially as described.

2. In a ball bearing caster the combination of a cast metal socket carried by the horns, an internal tubular steel piece and a disk lining the socket, a shank having a bearing fit in the lined socket, a ball arranged between the bottom of the shank and the disk, and a closing plate for the socket arranged to hold the caster shank in position, the socket being adapted to hold lubricant preferably in a solidified form, substantially as described.

In witness whereof I have hereunto set my hand in presence of two witnesses.

BERTRAM TURNER.

Witnesses:
GEO. FUERY,
FRANCIS BINNS.